United States Patent
Moir et al.

(10) Patent No.: US 7,398,355 B1
(45) Date of Patent: *Jul. 8, 2008

(54) AVOIDING LOCKS BY TRANSACTIONALLY EXECUTING CRITICAL SECTIONS

(75) Inventors: Mark S. Moir, Hampton, NH (US); Marc Tremblay, Menlo Park, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/195,093

(22) Filed: Aug. 1, 2005

Related U.S. Application Data

(63) Continuation-in-part of application No. 10/764,412, filed on Jan. 23, 2004, now Pat. No. 7,089,374.

(60) Provisional application No. 60/447,128, filed on Jan. 13, 2003.

(51) Int. Cl.
- G06F 12/00 (2006.01)
- G06F 13/00 (2006.01)
- G06F 13/28 (2006.01)
- G06F 9/30 (2006.01)
- G06F 9/40 (2006.01)
- G06F 15/00 (2006.01)

(52) U.S. Cl. ............... 711/118; 711/150; 711/151; 711/152; 711/163; 712/208

(58) Field of Classification Search ............ 711/118
See application file for complete search history.

(56) References Cited

U.S. PATENT DOCUMENTS 5,428,761 A    6/1995   Herlihy et al. ............ 711/130

(Continued)

FOREIGN PATENT DOCUMENTS

WO    WO 01 93028 A2    12/2001

(Continued)

OTHER PUBLICATIONS

"The Potential for Using Thread-Level Data Speculation to Facilitate Automatic Parallelization", by J. Gregory Steffan et al., 1998, IEEE, pp. 2-13.

(Continued)

*Primary Examiner*—Hong Kim
*Assistant Examiner*—Marwan Ayash
(74) *Attorney, Agent, or Firm*—Park, Vaughn & Fleming LLP

(57) ABSTRACT

One embodiment of the present invention provides a system that avoids locks by transactionally executing critical sections. During operation, the system receives a program which includes one or more critical sections which are protected by locks. Next, the system modifies the program so that the critical sections which are protected by locks are executed transactionally without acquiring locks associated with the critical sections. More specifically, the program is modified so that: (1) during transactional execution of a critical section, the program first determines if a lock associated with the critical section is held by another process and if so aborts the transactional execution; (2) if the transactional execution of the critical section completes without encountering an interfering data access from another process, the program commits changes made during the transactional execution and optionally resumes normal non-transactional execution of the program past the critical section; and (3) if an interfering data access from another process is encountered during transactional execution of the critical section, the program discards changes made during the transactional execution, and attempts to re-execute the critical section zero or more times.

20 Claims, 6 Drawing Sheets

U.S. PATENT DOCUMENTS

| | | | |
|---|---|---|---|
| 5,701,432 A | 12/1997 | Wong et al. | 711/130 |
| 5,742,785 A | 4/1998 | Stone et al. | 712/217 |
| 5,835,764 A | 11/1998 | Platt et al. | 718/101 |
| 5,940,827 A | 8/1999 | Hapner et al. | 707/8 |
| 5,974,438 A | 10/1999 | Neufeld | 718/104 |
| 6,021,480 A | 2/2000 | Pettey | 711/201 |
| 6,185,577 B1 | 2/2001 | Nainani et al. | |
| 6,360,220 B1 | 3/2002 | Forin | 707/8 |
| 6,460,124 B1* | 10/2002 | Kagi et al. | 711/163 |
| 6,578,033 B1 | 6/2003 | Singhal et al. | 707/8 |
| 6,681,311 B2 | 1/2004 | Gaskins et al. | 711/203 |
| 6,918,012 B2 | 7/2005 | Venkitakrishnan et al. | 711/150 |
| 6,941,449 B2 | 9/2005 | Ross | 712/35 |
| 2002/0087810 A1 | 7/2002 | Boatright et al. | 711/145 |
| 2002/0178349 A1 | 11/2002 | Shibayama et al. | 712/235 |
| 2003/0079094 A1* | 4/2003 | Rajwar et al. | 711/150 |
| 2004/0162948 A1 | 8/2004 | Tremblay et al. | 711/137 |
| 2004/0186970 A1 | 9/2004 | Kekre et al. | 711/62 |

FOREIGN PATENT DOCUMENTS

| | | |
|---|---|---|
| WO | WO 03/054693 | 7/2003 |

OTHER PUBLICATIONS

Publication entitled "Speculation-Based Techniques for Transactional Lock-Free Execution of Lock-Based Programs", by Ravi Rajwar, Online! 2002, XP002286237, Retrieved from the internet: URL:http://bbcr.uwaterloo.ca/{brecht/courses/856/readings-new/rajwar02speculationsbased.pdf.

Publication entitled "Checkpoint Processing and Recovery: Towards Scalable Large Instruction Window Processors", by Haitham Akkary et al., Proceedings of th e 36th International Symporuim on Microarchitecture, 2003, IEEE.

Publication entitled "Multiple Reservations and the Oklahoma Update", by Janice M. Stone et al., IEEE Parallel & Distributed Technology, Nov. 1993, pp. 58-71.

Publication entitled "Improving the Throughput of Synchronization by Insertion of Delays", by Ravi Rajwar et al. Proceedings of the Sixth International Symposuim on High-Performance Computer Architecture, Jan. 8-12, 2000, pp. 168-179.

Publication entitled "Checkpoint Processing and Recovery: An Efficient, Scalable Alternative to Reorder Buffers" Haitham Akkary et al. IEEE Computer Society, Nov.-Dec. 2003, pp. 11-19.

Publication entitled "Multi-view Memory to Support OS Locking For Transaction Systems", P. Bodorik et al., IEEE, 1997, pp. 309-318.

Publication entitled "Indexing for Multiversion Locking: Alternatives and Performance Evaluation", Paul M. Bober et al, IEEE Transactions on Knowledge and Data Engineering, vol. 9, No. 1, Jan.-Feb. 1997, pp. 68-84.

Publication entitled: "Transactional Execution: Toward Reliable, High-Performance Multithreading" by Ravi Rajwar et al. IEEE Computer Society, Nov.-Dec. 2003, pp. 117-125.

Publication: "Speculative Lock Elision: Enabling Highly Concurrent Multithread Execution" by Ravi Rajwar and James R. Goodman, Computer Sciences Department, University of Wisconsin-Madison, Madison, WI 53706 USA, rajwar@cs.wisc.edu, XP-001075852, published in IEEE Journal Jan. 12, 2001, pp. 294-305.

"Structured Computer Organization" by Andrew S. Tanenbaum, Published 1999, pp. 5, 7-8.

"The Transaction Concept: Virtues and Limitations" by Jim Gray. Pro. Int'l Conf. Very Large Databases, Morgan Kaufman, 1981. pp. 144-154.

"Toward Efficient and Robust Software Speculative Parallelization on Multiprocessors" by Marcelo Cintra and Diego R. Lianos, PPoPP' 03 Jun. 11-13, 2003 ACM 1-58113-588-2/03/0006 pp. 13-24.

"Microsoft Computer Dictionary" Fifth Edition, pub 2002, p. 378.

Publication: "Specuculative Synchronization: Applying Thread-Level Speculation to Explicitly Parallel Applications" by Jose F. Martinez and Josep Torrellas, Dept. of Computer Science, University of Illinois at Urbana-Champaign, Urbana, IL 61801 USA, http://iacoma.cs.uiuc.edu, XP-002285169, published in ASPLOS X, Oct. 2002, pp. 18-29.

Publication: "Transactional Memory: Architectural Support for Lock-Free Data Structures" by Maurice Herlihy, Digital Equip. Corp. Cambridge Research Laboratory, Cambridge, MA 02139, herlihy@crl.dcc.com and J. Eliot B. Moss, Dept. of Computer Science, University of Massachusetts, Amherst, MA 01003, moss@cs.umass.edu, XP-000380375, published in Computer Architecture News, May 21, 1993, pp. 289-300.

Publication: "Enhancing Software Reliability with Speculative Threads" by Jeffrey Oplinger and Monica S. Lam, Computer Systems, Laboratory, Stanford University, jeffop@stanford.edu, XP-002285168 published in SPLOS X, 10-2202, pp. 184-196.

"Lock-Based Programs and Transactional Lock-Free Execution", by Ravi Rajwar et al., University of Wisconsin-Madison Technical Report #1440, Apr. 2002.

"Speculative Locks for Concurrent Execution of Critical Sections in Shared-Memory Multiprocessors", by Jose F Martinez et al., Workshop on Memory Performance Issues, International Symposium on Computer Architecture, Jun. 2001.

"Transactional Memory: Architectural Support for Lock-Free Data Structures", by Maurice Herlihy, 1993.

"Speculative Locks for Concurrent Execution of Critical Sections in Shared-Memory Multiprocessors", by Jose F. Martinez et al., Technical Report UIUCDCS-R-2001-2202, Feb. 2001.

"Transactional Lock-Free Execution of Lock-Based Programs", by Ravi Rajwar, Proceedings of the Tenth International Conference on Architectural Support for Programming Languages and Operating Systems, Oct. 6-Oct. 9, 2002, San Jose, CA.

* cited by examiner

| OLD VERSION | NEW VERSION | |
|---|---|---|
| ⋮ | ⋮ | |
| ACQUIRE LOCK | STE | <FAIL PC> |
| ⋮ | ⋮ | |
| CRITICAL SECTION  | CRITICAL SECTION | |
| ⋮ | ⋮ | |
| RELEASE LOCK | COMMIT | |
| ⋮ | ⋮ | |

AVOIDING LOCKS BY TRANSACTIONALLY EXECUTING CRITICAL SECTIONS

RELATED APPLICATION

This application is a continuation-in-part of and hereby claims priority under 35 U.S.C. §120 to a pending U.S. patent application, entitled, "Selectively Unmarking Load-Marked Cache Lines During Transactional Program Execution," by inventors Marc Tremblay, Quinn A. Jacobson, Shailender Chaudhry, Mark S. Moir and Maurice P. Herlihy, Ser. No. 10/764,412, filed 23 Jan. 2004 now U.S. Pat. No. 7,089,374, and hereby claims priority through application Ser. No. 10/764,412 under 35 U.S.C. §119 to U.S. Provisional Application No. 60/447,128, filed on 13 Feb. 2003, entitled "Transactional Memory," by inventors Shailender Chaudhry, Marc Tremblay, and Quinn A. Jacobson.

BACKGROUND

1. Field of the Invention

The present invention relates to techniques for improving performance within computer systems. More specifically, the present invention relates to a method and an apparatus for avoiding the overhead involved in using locks by transactionally executing critical sections of code.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use of locks. A lock is typically acquired before a thread enters a critical section of code, and is released after the thread exits the critical section. If another thread wants to enter a critical section protected by the same lock, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure. It also introduces significant software engineering concerns, such as avoiding deadlock.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections.

SUMMARY

One embodiment of the present invention provides a system that avoids locks by transactionally executing critical sections. During operation, the system receives a program which includes one or more critical sections which are protected by locks. Next, the system modifies the program so that the critical sections which are protected by locks are executed transactionally without acquiring locks associated with the critical sections.

More specifically, the program is modified so that: (1) during transactional execution of a critical section, the program first determines if a lock associated with the critical section is held by another process and if so aborts the transactional execution; (2) if the transactional execution of the critical section completes without encountering an interfering data access from another process, the program commits changes made during the transactional execution and (optionally) resumes normal non-transactional execution of the program past the critical section (note that a system can possibly coalesce a number of smaller transactions into a larger one, in which case the system may not immediately resume non-transactional execution past a critical section which is associated with a smaller transaction); and (3) if an interfering data access from another process is encountered during transactional execution of the critical section, the program discards changes made during the transactional execution, and attempts to re-execute the critical section zero or more times.

Note that checking the lock status within the transaction (as in step (1) above) allows the transaction to work correctly with other processes that actually acquire the lock before executing the critical section non-transactionally. This is an advantage because it allows the technique to be selectively applied where it is likely to be useful, rather than applying it across-the-board, which could potentially degrade performance in some cases.

Also note that the code modification process can possibly be performed manually. For example, a programmer can identify critical sections that are frequently used, and can manually replace corresponding lock acquire and lock release calls with special calls that cause the critical section to be executed transactionally, without acquiring the lock.

In a variation on this embodiment, modifying the program can involve: using a compiler to modify the program; using a binary modification tool to modify the program; or replacing libraries accessed by the program; In a variation on this embodiment, data accesses from other processes are allowed to proceed during the transactional execution of the critical section.

In a variation on this embodiment, attempting to re-execute the critical section involves attempting to transactionally re-execute the critical section.

In a variation on this embodiment, the program is modified so that if the critical section is not successfully completed after one or more attempts at transactional execution, the program: acquires a lock associated with the critical section; non-transactionally executes the critical section; and releases the lock associated with the critical section.

In a variation on this embodiment, the interfering data access can include: a store by another process to location which was loaded from during transactional execution; a load by another process to a location which was stored to during transactional execution; or a store by another process to a location which was stored to during transactional execution.

In a variation on this embodiment, commencing transactional execution of a critical section involves performing a checkpointing operation to checkpoint register values and other state information.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
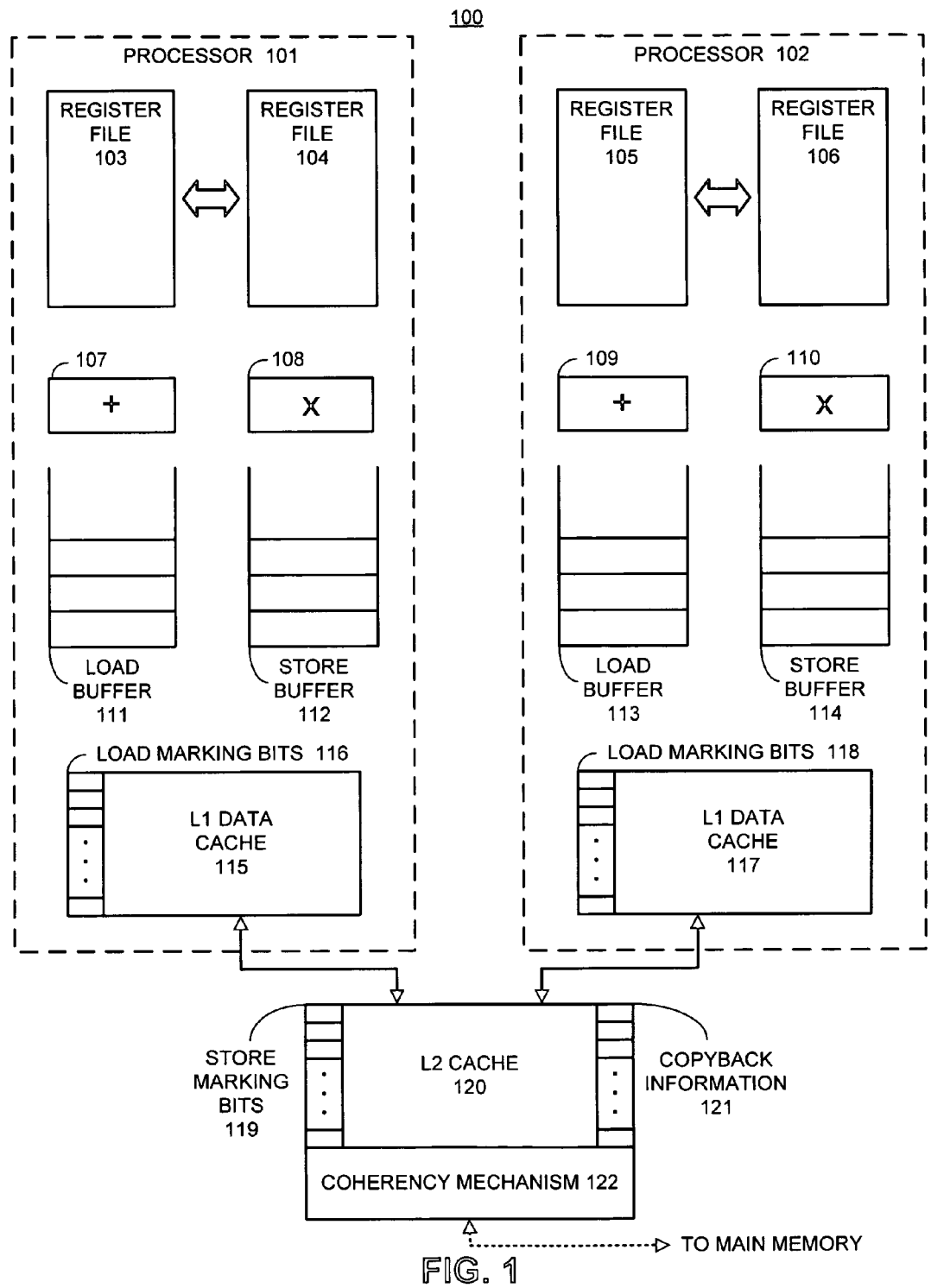
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during transactional execution as is described below with reference to FIGS. 3-8. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2A:
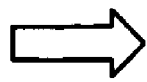
FIG. 2A illustrates how a critical section is executed in accordance with an embodiment of the present invention.

FIG. 2A illustrates how a critical section is executed in accordance with an embodiment of the present invention. As is illustrated in the left-hand side of FIG. 2A, a thread that executes a critical section typically acquires a lock associated with the critical section before entering the critical section. If the lock has been acquired by another thread, the thread may have to wait until the other thread releases the lock. Upon leaving the critical section, the thread releases the lock. (Note that the terms "thread" and "process" are used interchangeably throughout this specification.)

A lock can be associated with a shared data structure. For example, before accessing a shared data structure, a thread can acquire a lock on the shared data structure. The thread can then execute a critical section of code that accesses the shared data structure. After the thread is finished accessing the shared data structure, the thread releases the lock.

In contrast, in the present invention, the thread does not acquire a lock, but instead executes a start transactional execution (STE) instruction before entering the critical section. If the critical section is successfully completed without interference from other threads, the thread performs a commit operation, to commit changes made during transactional execution. This sequence of events is described in more detail below with reference to FIGS. 3-8.

Note that in one embodiment of the present invention a compiler replaces lock-acquiring instructions with STE instructions, and also replaces corresponding lock releasing instructions with commit instructions. Note that there may not be a one-to-one correspondence between replaced instructions. For example, a single lock acquisition operation comprised of multiple instructions may be replaced by a single STE instruction.

Figure 2B:
FIG. 2B illustrates another example of how a critical section is executed in accordance with an embodiment of the present invention.

Note that in many cases we will want to maintain the ability to fall back on the lock in case we cannot make progress for some reason. Also, from a software engineering standpoint, it will often be desirable to transform the code only in common paths, and leave locking code intact in uncommon paths. To facilitate this, in transforming a critical section to execute transactionally, we can replace the lock-acquire with an STE instruction followed by code that reads the lock state transactionally and checks that the lock is not held (see FIG. 2B).

The above discussion presumes that the processor's instruction set has been augmented to include an STE instruction and a commit instruction. These instructions are described in more detail below with reference to FIGS. 3-9.

Transactional Execution Process

Figure 3:
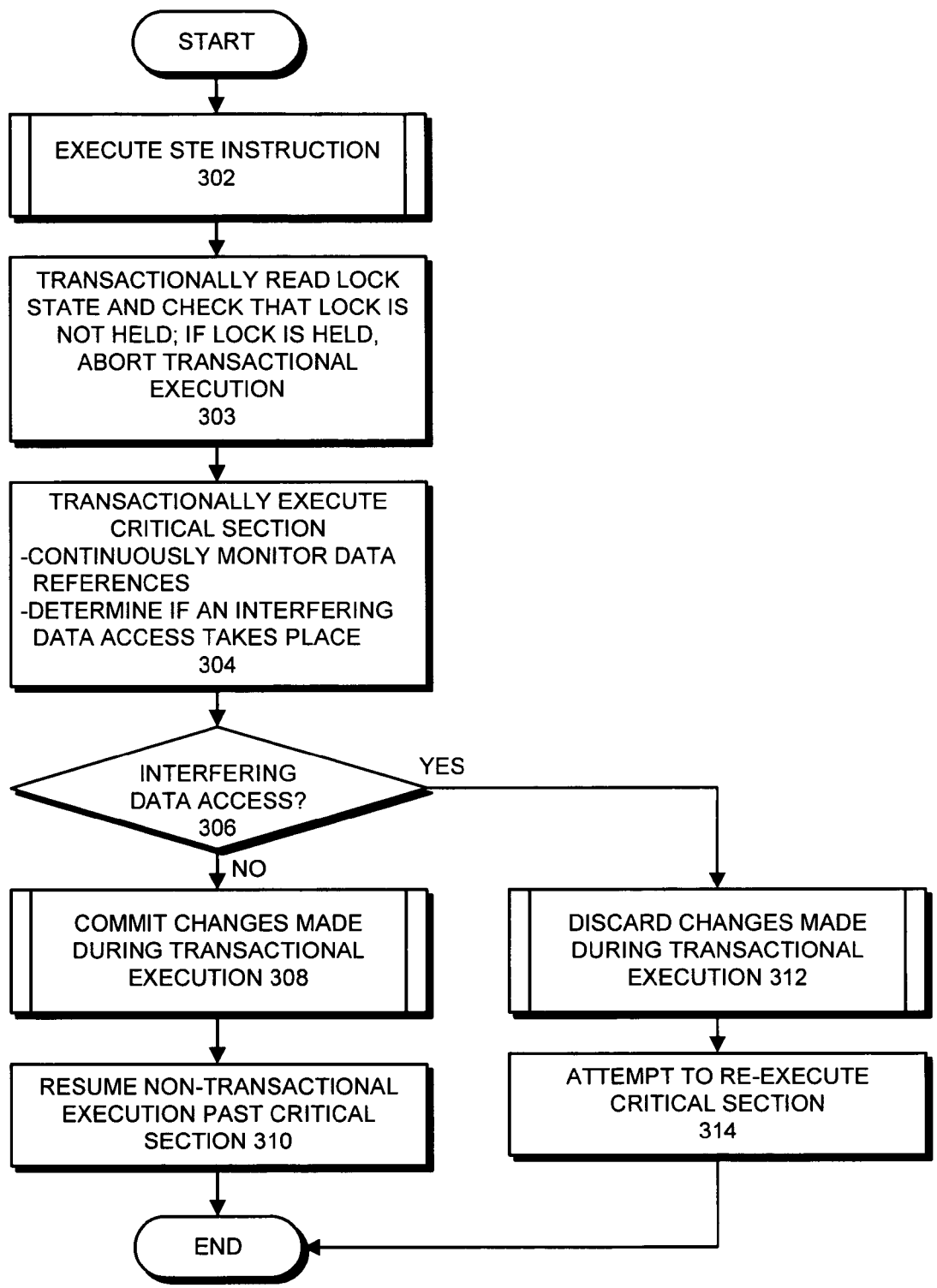
FIG. 3 presents a flow chart illustrating the transactional execution process in accordance with an embodiment of the present invention.

FIG. 3 presents a flow chart illustrating how transactional execution takes place in accordance with an embodiment of the present invention. A thread first executes an STE instruction prior to entering of a critical section of code (step 302). Next, the system transactionally executes code within the critical section, without committing results of the transactional execution (step 304).

At the start of transactional execution of the critical section, the program transactionally reads the lock state associated with the critical section and checks that the lock is not held. If the lock is held, the system aborts transactional execution (step 303). Note that if another process acquires the lock during transactional execution of the critical section, the transactional execution of the critical section will be aborted because the initial transactional read of the lock state will be "interfered with" by the lock acquisition operation.

During this transactional execution, the system continually monitors data references made by other threads, and determines if an interfering data access (or other type of failure) takes place during transactional execution. If not, the system atomically commits all changes made during transactional execution (step 308) and then optionally resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts to transactionally re-execute the critical section zero, one, two or more times. If these attempts are not successful, the system executes an alternative block of code in normal execution mode. This alternative code may additionally attempt to perform the transaction and will likely have the ability to revert back to the conventional technique of acquiring a lock on the critical section before entering the critical section, and then releasing the lock after leaving the critical section.

Note that an interfering data access can include a store by another thread to a cache line that has been load-marked by the thread. It can also include a load or a store by another thread to a cache line that has been store-marked by the thread.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

Figure 4:
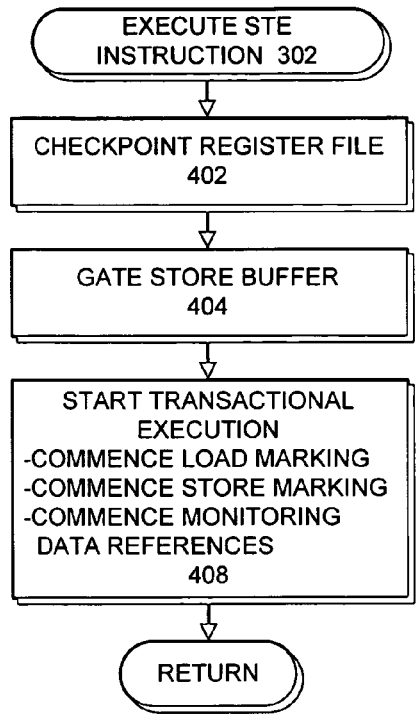
FIG. 4 presents a flow chart illustrating a start transactional execution (STE) operation in accordance with an embodiment of the present invention.

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing thread. In general, the flash copy operation checkpoints enough state to be able to restart the corresponding thread.

At the same time the register file is checkpointed, the STE operation also causes store buffer 112 to become "gated"

(step 404). This allows existing entries in store buffer to propagate to the memory sub-system (and to thereby become committed to the architectural state of the processor), but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

Figure 5:
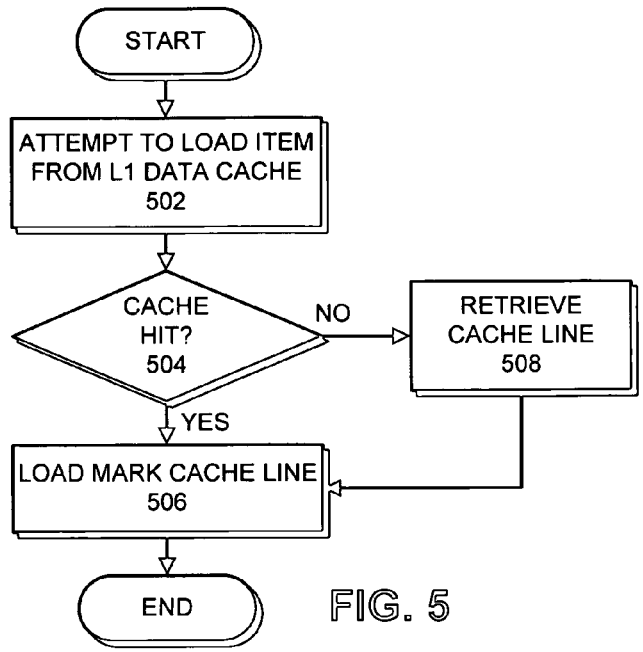
FIG. 5 presents a flow chart illustrating how load-marking is performed during transactional execution in accordance with an embodiment of the present invention.

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, the system first attempts to load a data item from L1 data cache 115 (step 502). If the load causes a cache hit, the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

Figure 6:
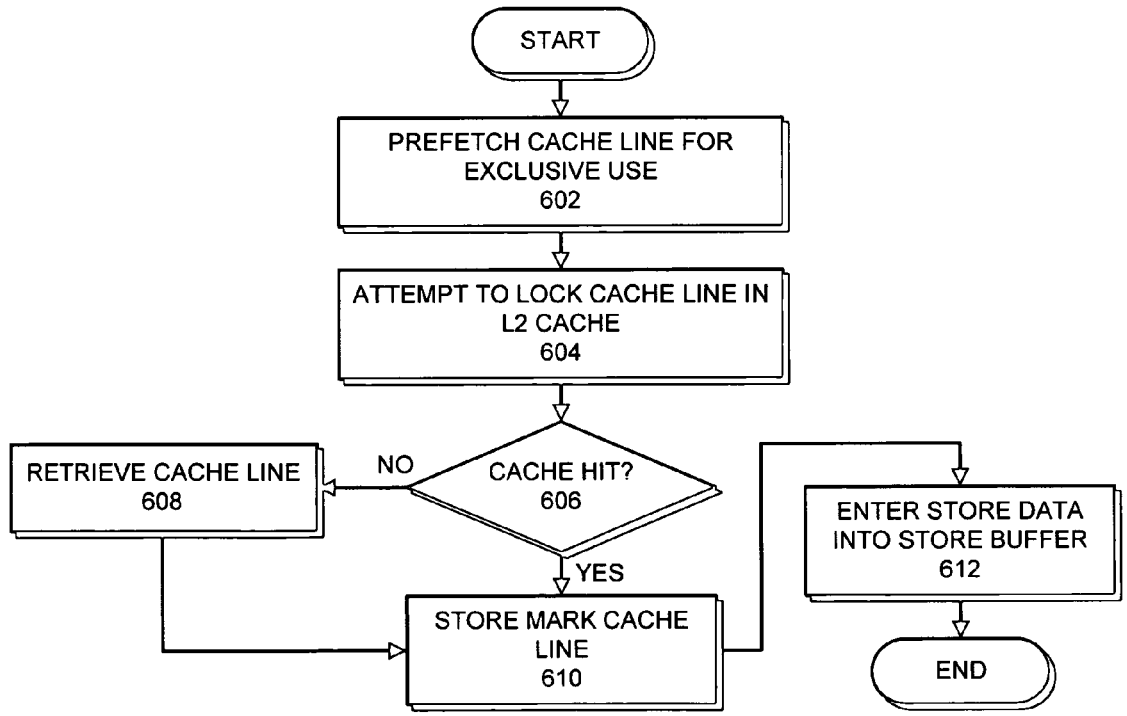
FIG. 6 presents a flow chart illustrating how store-marking is performed during transactional execution in accordance with an embodiment of the present invention.

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
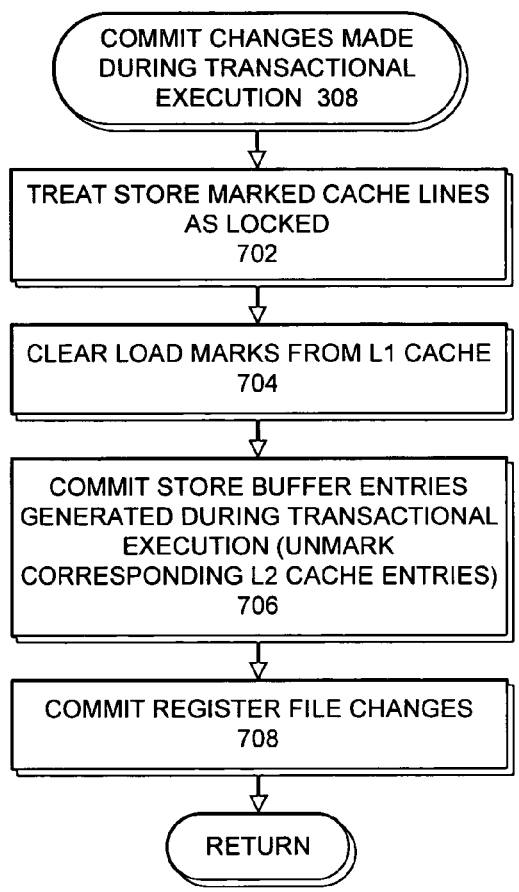
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other threads that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

Figure 8:
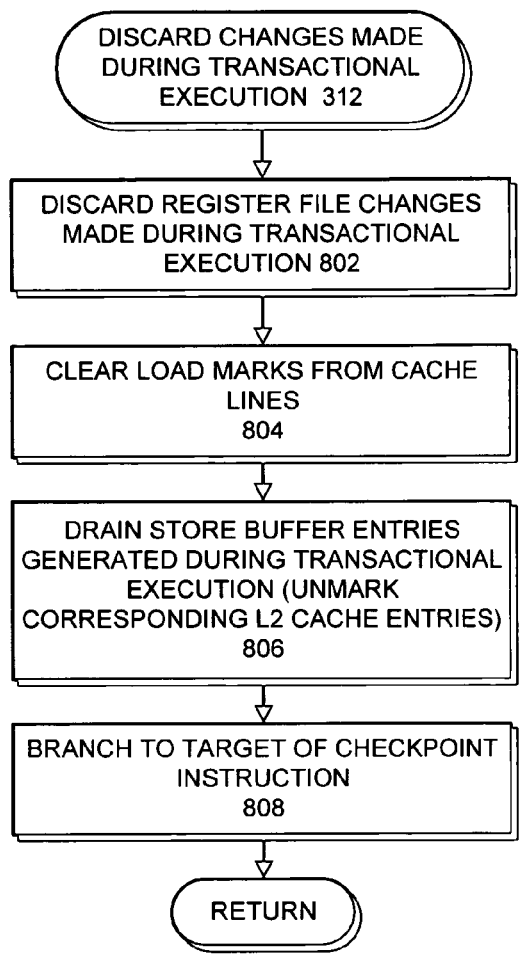
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location optionally attempts to re-execute the critical section (as is described above with reference to step 314 of FIG. 1) or takes other action in response to the failure, for example backing off to reduce contention.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying a program to avoid locks by transactionally executing critical sections, comprising:

receiving a program which includes one or more critical sections which are protected by locks;

modifying the program so that the critical sections which are protected by locks are executed transactionally without acquiring locks associated with the critical sections;

wherein the program is modified so that, a start transactional execution (STE) instruction is executed before entering the critical section;

during transactional execution of a critical section, the program first determines if a lock associated with the critical section is held by another process and if so aborts the transactional execution;

if the transactional execution of the critical section completes without encountering an interfering data access from another process, the program commits changes made during the transactional execution and optionally resumes normal non-transactional execution of the program past the critical section; and if an interfering data access from another process is encountered during transactional execution of the critical section, the program discards changes made during the transactional execution, and attempts to re-execute the critical section zero or more times;

wherein the program executes in normal execution mode an alternate block of code that is specified by the STE instruction if the program does not attempt to re-execute the critical section or all attempts to re-execute the critical section fail.

2. The method of claim 1, wherein modifying the program involves:
   using a compiler to modify the program;
   using a binary modification tool to modify the program; or
   replacing libraries accessed by the program.

3. The method of claim 1, wherein data accesses from other processes are allowed to proceed during the transactional execution of the critical section.

4. The method of claim 1, wherein attempting to re-execute the critical section involves attempting to transactionally re-execute the critical section.

5. The method of claim 4, wherein the program is modified so that if the critical section is not successfully completed after one or more attempts at transactional execution, the program:
   acquires a lock associated with the critical section;
   non-transactionally executes the critical section; and
   releases the lock associated with the critical section.

6. The method of claim 1, wherein the interfering data access can include:
   a store by another process to location which was loaded from during transactional execution;
   a load by another process to a location which was stored to during transactional execution; and
   a store by another process to a location which was stored to during transactional execution.

7. The method of claim 1, wherein commencing transactional execution of a critical section involves performing a checkpointing operation to checkpoint register values and other state information.

8. A method for avoiding locks by transactionally executing critical sections of code, comprising:
   prior to transactionally executing critical sections of code, executing a start transactional execution (STE) instruction;
   allowing a process to transactionally execute a critical section of code within a program without acquiring a lock associated with the critical section;
   wherein transactionally executing the critical section involves first determining if the lock associated with the critical section is held by another process and if so aborting the transactional execution;
   wherein if the process completes the critical section without encountering an interfering data access from another process, the method further comprises,
      committing changes made during the transactional execution, and
      optionally resuming normal non-transactional execution of the program past the critical section; and
   wherein if an interfering data access from another process is encountered during transactional execution of the critical section, the method further comprises,
      discarding changes made during the transactional execution, and
      attempting to re-execute the critical section zero or more times;
   wherein the program executes in normal execution mode an alternate block of code that is specified by the STE instruction if the program does not attempt to re-execute the critical section or all attempts to re-execute the critical section fail.

9. The method of claim 8, wherein before executing the program, the method further comprises modifying the program so that critical sections which are protected by locks are executed transactionally.

10. The method of claim 9, wherein modifying the program involves:
    using a compiler to modify the program;
    using a binary modification tool to modify the program; or
    replacing libraries accessed by the program.

11. The method of claim 8, wherein data accesses from other processes are allowed to proceed during the transactional execution of the critical section.

12. The method of claim 8, wherein attempting to re-execute the critical section involves attempting to transactionally re-execute the critical section.

13. The method of claim 12, wherein if the critical section is not successfully completed after one or more attempts at transactional execution, the method further comprises:
    acquiring a lock associated with the critical section;
    non-transactionally executing the critical section; and
    releasing the lock associated with the critical section.

14. The method of claim 8, wherein commencing transactional execution of a critical section involves performing a checkpointing operation to checkpoint register values and other state information.

15. The method of claim 8, wherein the interfering data access can include:
    a store by another process to location that the process has loaded from during transactional execution;
    a load by another process to a location that the process has stored to during transactional execution; and
    a store by another process to a location that the process has stored to during transactional execution.

16. An apparatus that modifies a program to avoid locks by transactionally executing critical sections, comprising:
    a processor configured to modify the program so that critical sections which are protected by locks are executed transactionally without acquiring locks associated with the critical sections;
    wherein the processor is configured to modify the program so that,
       a start transactional execution (STE) instruction is executed before entering the critical section and an instruction is executed before entering the critical section that aborts the transactional execution when it is determined that another thread holds a lock associated with the critical section;
       if the transactional execution of the critical section completes without encountering an interfering data access from another process, the program commits changes made during the transactional execution and optionally resumes normal non-transactional execution of the program past the critical section; and
       otherwise, if an interfering data access from another process is encountered during transactional execution of the critical section, the program discards changes made during the transactional execution, and attempts to re-execute the critical section zero or more times;
       wherein the program executes in normal execution mode an alternate block of code that is specified by the STE instruction if the program does not attempt to re-execute the critical section or all attempts to re-execute the critical section fail.

17. The apparatus of claim 16, wherein when modifying the program, the processor is configured to execute program code that causes the processor to perform the modification, wherein the program code includes one or more of:
- a compiler;
- a binary modification tool; or
- a mechanism that replaces libraries accessed by the program.

18. The apparatus of claim 16, wherein data accesses from other processes are allowed to proceed during the transactional execution of the critical section.

19. The apparatus of claim 16, wherein attempting to re-execute the critical section involves attempting to transactionally re-execute the critical section.

20. The apparatus of claim 19, wherein the program is modified so that if the critical section is not successfully completed after one or more attempts at transactional execution, the program:
- acquires a lock associated with the critical section;
- non-transactionally executes the critical section; and
- releases the lock associated with the critical section.

* * * * *